US011280392B2

(12) United States Patent  
Arnelöf et al.

(10) Patent No.: US 11,280,392 B2  
(45) Date of Patent: Mar. 22, 2022

(54) GEARBOX FOR VEHICLES AND VEHICLES COMPRISING SUCH A GEARBOX

(71) Applicant: Scania CV AB, Södertälje (SE)

(72) Inventors: Per Arnelöf, Vendelsö (SE); Peer Norberg, Hägersten (SE); Tomas Selling, Tyresö (SE)

(73) Assignee: SCANIA CV AB

( * ) Notice: Subject to any disclaimer, the term of this patent is extended or adjusted under 35 U.S.C. 154(b) by 0 days.

(21) Appl. No.: 17/277,757

(22) PCT Filed: Sep. 12, 2019

(86) PCT No.: PCT/SE2019/050858  
§ 371 (c)(1),  
(2) Date: Mar. 19, 2021

(87) PCT Pub. No.: WO2020/076206  
PCT Pub. Date: Apr. 16, 2020

(65) Prior Publication Data  
US 2021/0356023 A1   Nov. 18, 2021

(30) Foreign Application Priority Data  
Oct. 9, 2018 (SE) .................................... 1851227-7

(51) Int. Cl.  
*F16H 61/70* (2006.01)  
*F16H 37/04* (2006.01)  
*F16H 3/54* (2006.01)

(52) U.S. Cl.  
CPC ............. *F16H 37/046* (2013.01); *F16H 3/54* (2013.01); *F16H 61/70* (2013.01); *B60Y 2200/14* (2013.01); *F16H 2200/0034* (2013.01)

(58) Field of Classification Search  
CPC .......... F16H 3/54; F16H 37/046; F16H 61/70; F16H 2200/0034  
See application file for complete search history.

(56) References Cited

U.S. PATENT DOCUMENTS 5,447,478 A * 9/1995 Braun .................... F16H 37/042  
   475/282  
6,196,944 B1   3/2001 Schmitz ........................ 475/303  
(Continued)

FOREIGN PATENT DOCUMENTS

DE   10 2014 200 689 A1   7/2015  
SE         540 153 C2   4/2018  
(Continued)

OTHER PUBLICATIONS

Novelty Search Report dated May 18, 2018.  
(Continued)

*Primary Examiner* — Huan Le  
(74) *Attorney, Agent, or Firm* — Ostrolenk Faber LLP (57) ABSTRACT

A gearbox for a vehicle that includes a planetary gear with a ring gear, a sun gear and a planet gear carrier, on which at least one planet gear is rotatably mounted, which ring gear and sun gear are configured to engage with the at least one planet gear; a gearbox housing surrounding the planetary gear; an input shaft and an output shaft for the transfer of torque to and from the gearbox; a first axially movable coupling sleeve for selectively engaging and disengaging the planetary gear with/from the gearbox housing and for selectively engaging and disengaging the ring gear, the sun gear and the planet gear carrier with/from each other; and a second axially movable coupling sleeve for selectively engaging and disengaging the output shaft with/from the ring gear and with/from the planet gear carrier.

16 Claims, 7 Drawing Sheets

(56) References Cited

U.S. PATENT DOCUMENTS

| | | | |
|---|---|---|---|
| 8,641,573 B2* | 2/2014 | Ideshio | F16H 3/725 |
| | | | 475/218 |
| 8,696,513 B2* | 4/2014 | Brinn | F16H 3/54 |
| | | | 475/286 |
| 10,493,839 B2* | 12/2019 | Kaltenbach | B60K 6/387 |
| 2008/0032846 A1 | 2/2008 | Heinzelmann | 475/207 |
| 2008/0194375 A1* | 8/2008 | Voigt | F16H 3/54 |
| | | | 475/296 |
| 2010/0319485 A1 | 12/2010 | Miller et al. | |
| 2015/0226324 A1 | 8/2015 | Gluckler et al. | |
| 2017/0089429 A1 | 3/2017 | Slapak | |
| 2017/0089437 A1 | 3/2017 | Arnelöf | |

FOREIGN PATENT DOCUMENTS

| | | |
|---|---|---|
| SE | 540 167 C2 | 4/2018 |
| WO | WO 01/55620 A1 | 8/2001 |
| WO | WO 2014/042575 A1 | 3/2014 |
| WO | WO 2015/183159 A1 | 12/2015 |
| WO | WO 2017/095299 A1 | 6/2017 |

OTHER PUBLICATIONS

Office Action dated Apr. 29, 2019 in corresponding Swedish Patent Application No. 1851227-7.
International Search Report dated Nov. 7, 2019 in corresponding PCT International Application No. PCT/SE2019/050858.
Written Opinion dated Nov. 7, 2019 in corresponding PCT International Application No. PCT/SE2019/050858.

* cited by examiner

GEARBOX FOR VEHICLES AND VEHICLES COMPRISING SUCH A GEARBOX

CROSS-REFERENCE TO RELATED APPLICATIONS

The present application is a 35 U.S.C. §§ 371 national phase conversion of International Application No. PCT/SE2019/050858, filed Sep. 12, 2019, which claims priority to Swedish Patent Application No. 1851227-7, filed Oct. 9, 2018, the contents of both of which are incorporated herein by reference. The PCT International Application was published in the English language.

TECHNICAL FIELD

The invention relates to a gearbox for vehicles according to the appended claims. The invention also relates to a vehicle comprising such a gearbox according to the appended claims.

BACKGROUND

Vehicles, and especially heavier vehicles such as trucks, are often provided with a gearbox, also called range gearbox, connected to the main gearbox to double the number of gears. Such an auxiliary gearbox usually includes a planetary gear, which has a low gear and a high gear, wherein the main gearbox shift facilities can be divided into a low range gear position and a high range gear position. In the low range gear position a downshift takes place through the planetary gear, and in the high range gear the gear ratio is 1:1 in the planetary gear.

The range gearbox is usually provided between the main gearbox and a propeller shaft coupled to the drive wheels of the vehicle. The range gearbox is accommodated in a gearbox housing and comprises an input shaft coupled to the main gearbox, an output shaft and the planetary gear is disposed between the input shaft and the output shaft. The planetary gear usually comprises three components, which are rotatably arranged relative to each other namely a sun gear, a planet gear carrier with planet gears and a ring gear. With knowledge of the number of teeth of the sun gear and the ring gear the relative speed of the three components can be determined during operation. In a range gearbox, the sun gear can be rotatably connected to the input shaft, a number of planet gears engage the sun gear and are rotatably mounted on the planet gear carrier which is fixedly connected to the output shaft, and an axially displaceable ring gear surrounds and engages the planet gears. The teeth of the sun gear, planet gears and ring gear can be helical, that is, they have an angle to a common rotation axis of the sun gear, the planet gear carrier and the ring gear. By cutting the teeth of the gears in an angle in relation to the rotation axis of the gear, the generated sound from the planetary gear is reduced. However, due to the helical teeth, a reaction force arises from the gears in the planetary gear in the direction of the rotation axis. The direction of the reaction force depends on the direction in which the gears of the planetary gear are helical. Thus, the reaction force is directed backward or forward in the extension of the rotation axis.

In a known range gearbox, the low range gear position and the high range gear position are obtained by displacing the ring gear axially between the low range gear position, in which the ring gear is rotationally locked relative to the gearbox housing, and the high range gear position in which the ring gear is rotatable relative to the gearbox housing and where the ring gear, the planet gears and the sun gear rotate as a common unity. The planetary gear comprises two coupling rings arranged on each side of the ring gear and two synchronizing rings arranged on each side of the ring gear. Synchronizer rings provide a synchronous shift.

The document WO0155620 discloses a synchronization device in a planetary gear in which the planetary gear includes a sun gear, a planet gear carrier and a ring gear. The sun gear is rotatably connected with the input shaft and a number of planet gears engaging with the sun gear, which planet gears are rotatably mounted on the planet gear carrier, which is connected to the output shaft. An axially displaceable ring gear surrounds and meshes with the planet gears. Low and high gear are obtained by the ring gear that is displaced axially between low range gear and high range gear.

The document U.S. Pat. No. 6,196,944 shows a planetary gear comprising a sun gear, a planet gear carrier with planet gears and a ring gear. The sun gear may be connected to the input shaft by means of a coupling sleeve in a low range gear position and disengaged from the input shaft in a high range gear position. In the high range gear position, the input shaft is connected to the planet gear carrier by means of the same coupling sleeve. The ring gear is firmly connected to a gearbox housing. The known planetary gear is arranged in an auxiliary gearbox, having only two gear positions.

The reverse gear in a transmission in a vehicle is often arranged in the main gearbox, which then comprises a gear which is engaged when the vehicle is to be driven in the reverse direction. The gear wheel, which is intended for the reverse gear, causes an elongation of the main gearbox, and an undesired increase in weight of the vehicle. The reverse gear wheel rotates in the opposite direction to the other gears in the main gearbox, which causes losses. Said gear wheel which is intended for the reverse gear has a tendency to produce undesirable noise in the transmission, which is a result of an intermediate gear wheel disposed between a lay shaft and a main shaft in the main gearbox.

The document U.S. Pat. No. 6,196,944 shows a gearbox for motor vehicles comprising a planetary gear comprising a first and a second sleeve acting on the planet gear carrier, the ring gear, the gearbox housing and the output shaft. The first and second sleeves are controlled as one connected unit.

SUMMARY

Despite the known solutions there is a need to further develop a gearbox in which the time for shifting is short, where the wear of the components in the gearbox is low, and where the stress of the components in the gearbox is low.

An object of the present invention is therefore to provide a gearbox in which the time for shifting is short.

Another object of the invention is to provide a gearbox in which the wear of the components in the gearbox is low.

A further object of the invention is to provide a gearbox in which the stress of the components in the gearbox is low.

The herein mentioned objects are achieved with a gearbox for vehicles according to the appended claims.

The herein mentioned objects are also achieved with a vehicle with a gearbox according to the appended claims.

According to an aspect of the invention, a gearbox for a vehicle is provided, the gearbox comprising a planetary gear with a ring gear, a sun gear and a planet gear carrier, on which at least one planet gear is rotatably mounted, which ring gear and sun gear are configured to engage with the at least one planet gear; a gearbox housing surrounding the planetary gear; an input shaft and an output shaft for transfer of torque to and from the gearbox; a first axially movable coupling sleeve for selectively engaging and disengaging the planetary gear with/from the gearbox housing and for selectively engaging and disengaging the ring gear, the sun gear and the planet gear carrier with/from each other; and a second axially movable coupling sleeve for selectively engaging and disengaging the output shaft with/from the ring gear and with/from the planet gear carrier; wherein the first axially movable coupling sleeve, in a first gear position, is configured to engage the ring gear with the gearbox housing, and in a second gear position is configured to engage the sun gear with the ring gear; the second axially movable coupling sleeve, in the first gear position, is configured to engage the planet gear carrier with the output shaft, and in the second gear position is configured to engage the ring gear with the output shaft; and wherein the second axially movable coupling sleeve, in a neutral position, is configured to be positioned in an intermediate axial position between the first and second gear positions.

According to a further aspect of the invention, a vehicle is provided, wherein the vehicle comprises such a gearbox.

By such gearbox, the time for shifting is short. The axial stroke of the respective coupling sleeve is shorter compared with stroke length of the ring wheel of a traditional gearbox, which means that it is possible to quickly switch between different gear positions. Since the axial stroke of the coupling sleeves is short, the velocity and the power needed for axially displacing the coupling sleeves will be low. The low axial velocity and the low power needed for displacing the couplings sleeves will reduce the force acting on the coupling sleeves, the planetary gear, the gearbox housing and on the output shaft at the moment of engagement. Axially directed end surfaces of these components, such as axially directed end surfaces of splines may resist wear and stress that may occur from these axial directed forces. Further, the first coupling sleeve may be performed with a limited longitudinal extent, causing the weight of the coupling sleeve to be low. The low mass of the coupling sleeve means that it is possible to quickly shift between different gear positions. In addition, the low mass of the first coupling sleeve may reduce the power needed for axially displacing the first coupling sleeve, which results in low wear and stress on the components for engagement. Since the second axially movable coupling sleeve, in a neutral position, is configured to be positioned in an intermediate axial position between the first and second gear positions, an evenly wear on the engaging components is achieved. When shifting the gearbox, the second axially movable coupling sleeve will first be moved into the neutral position and thereafter engage the ring gear or the output shaft, depending on the gear to be shifted. This will result in an even wear on the engaging components, such as splines on the ring gear and on the planet gear carrier, which will be engaged by the second axially movable coupling sleeve.

The vehicle, comprising such a gearbox, has improved driving characteristics and an increased service of life. In addition, since the reliability of the gearbox increases, also the reliability of the overall vehicle increases.

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description of, as examples, preferred embodiments with reference to the enclosed drawings, in which.

DETAILED DESCRIPTION

The present disclosure relates to a gearbox for a vehicle. The axial stroke of coupling sleeves in the gearbox is short, which results in reduced velocity and power needed for axially displacing the coupling sleeves. This will reduce the force acting on components in the gearbox, which will reduce wear and stress on these components. The gearbox according to the present disclosure is also so configured that an even wear on components, which engage and disengage each other, will occur.

According to an aspect, the present disclosure relates to a gearbox for a vehicle, the gearbox comprising a planetary gear with a ring gear, a sun gear and a planet gear carrier, on which at least one planet gear is rotatably mounted, which ring gear and sun gear are configured to engage with the at least one planet gear; a gearbox housing surrounding the planetary gear; an input shaft and an output shaft for transfer of torque to and from the gearbox; a first axially movable coupling sleeve for selectively engaging and disengaging the planetary gear with/from the gearbox housing and for selectively engaging and disengaging the ring gear, the sun gear and the planet gear carrier with/from each other; and a second axially movable coupling sleeve for selectively engaging and disengaging the output shaft with/from the ring gear and with/from the planet gear carrier; wherein the first axially movable coupling sleeve, in a first gear position, is configured to engage the ring gear with the gearbox housing, and in a second gear position is configured to engage the sun gear with the ring gear; the second axially movable coupling sleeve, in the first gear position, is configured to engage the planet gear carrier with the output shaft, and in the second gear position is configured to engage the ring gear with the output shaft; and wherein the second axially movable coupling sleeve, in a neutral position, is configured to be positioned in an intermediate axial position between the first and second gear positions.

By such gearbox, the time for shifting is short. Since the axial stroke of the coupling sleeves is short, the velocity and the power needed for axially displacing the coupling sleeves will be low. The low axial velocity and the low power needed for displacing the couplings sleeves will reduce the force acting on the coupling sleeves, the planetary gear, the gearbox housing and on the output shaft at the moment of engagement. Axially directed end surfaces of these components, such as axially directed end surfaces of splines, may resist wear and stress that may occur from these axial directed forces. Further, the first coupling sleeve may be performed with a limited longitudinal extent, causing the weight of the coupling sleeve to be low. The low mass of the coupling sleeve means that it is possible to quickly shift between different gear positions. In addition, the low mass of the first coupling sleeve may reduce the power needed for axially displacing the first coupling sleeve, which results in low wear and stress on the components for engagement. Since the second axially movable coupling sleeve, in a neutral position, is configured to be positioned in an intermediate axial position between the first and second gear positions an even wear on the engaging components is achieved. When shifting the gearbox, the second axially movable coupling sleeve will first be moved into the neutral position and thereafter engage the ring gear or the output shaft, depending on the gear to be shifted. This will result in an even wear on the engaging components, such as splines on the ring gear and on the planet gear carrier, which will be engaged by the second axially movable coupling sleeve.

In the second gear position, the first axially displaceable coupling sleeve transmits torque from the input shaft to the ring gear, and the second axially displaceable coupling sleeve transmits torque from the ring gear to the output shaft. Thus, torque transmitted through the gearbox will bypass the sun gear and the planet gears, which decrease the possibility of facet damages on tooth flanks of the sun gear and the planet gears. Instead, torque will be forwarded through the gearbox via the ring gear as a physical entity, and not through the tooth flanks of the ring gear and the planet gears.

According to an example, the first axially movable coupling sleeve is, in a third gear position, configured to connect the planet gear carrier with the gearbox housing, and the second axially movable coupling sleeve is, in the third gear position, configured to connect the ring gear with the output shaft.

The third gear position corresponds to a reverse gear in the gearbox. A reverse gear in the gearbox is achieved when the first axially movable coupling sleeve is arranged to engage the planet gear carrier with the gearbox housing and the second axially movable coupling sleeve is arranged to engage the ring gear with the output shaft. Such a reverse gear results in an increased efficiency with lower losses. The reverse gear may easily be shifted by controlling the first and second axially displaceable coupling sleeves to the third gear position, corresponding to the reverse gear. When the gearbox according to the invention is arranged in the transmission of a vehicle, the traditional reverse gear in the main gearbox can be excluded, thus saving weight, space and fuel. The main shaft in the main gearbox can be performed with a shorter length since the reverse gear in the main gearbox can be omitted. Thus, the main shaft will exhibit less deflection when transmitting torque, which means that the life time of the bearings for the main shaft increases. Since the reverse gear is arranged in the range gearbox, the number of reverse gears in the transmission increases. The number of reverse gears may thus correspond with the number of gears in the main gearbox.

According to an example, the first axially movable coupling sleeve is, in the first gear position, configured to be disconnected from the sun gear and the planet gear carrier.

The gear ratio through the planetary gear will in the first position be decided by the configuration of the sun gear and the planet gear carrier. Depending on the type of vehicle and power source in the vehicle, the gearbox may be designed to fulfil the demands of driveability of the vehicle. Thus, the sun gear and the planet gear carrier may be configured to satisfy demands on gear ratio in the gearbox in order to achieve the relevant downshift through the planetary gear in the first gear position. The first gear position may correspond to a low range position in a range gearbox.

According to an example, the first axially movable coupling sleeve is, in a fourth gear position, configured to disconnect the planetary gear from the gearbox housing and to disconnect the ring gear, the sun gear and the planet gear carrier from each other.

A neutral position in the gearbox may be achieved by disengaging the planetary gear from the gearbox housing and to disconnect the ring gear, the sun gear and the planet gear carrier from each other. In the neutral position the gearbox may transfer no torque. Thus, the input shaft of the gearbox may rotate without transfer torque and rotational speed to the output shaft of the gearbox. The neutral position in the gearbox may be achieved by axially displacing the first axially movable coupling sleeve in a fourth gear position, which is configured to disconnect the planetary gear from the gearbox housing and to disconnect the ring gear, the sun gear and the planet gear carrier from each other. Such neutral position, controlled by the displacement of the first axially movable coupling sleeve, may be set in combination with a displacement of the second axially movable coupling sleeve to the neutral position. Such combination of neutral positions generated by both coupling sleeves may be used during service and repair of the gearbox. However, the synchronization when shifting gears in the gearbox may be more efficient if the second axially movable coupling sleeve engages the output shaft and the planet gear carrier in the fourth gear position.

According to an example, the first axially movable coupling sleeve, on an inner surface, comprises first splines, which are configured to engage with first splines arranged on the gearbox housing, the sun gear, the planet gear carrier and the ring gear.

A simple and efficient engagement and disengagement of the gearbox housing and the ring gear, the sun gear and the ring gear, and the gearbox housing and the planet gear carrier, respectively, are achieved by means of the first splines. However, when engaging two components provided with splines, the axially directed end surfaces of splines may interfere with each other. This depends on how the components are directed in the rotational direction in relation to each other. Since the axial stroke of the first axially movable coupling sleeve is short the velocity and the power needed for axially displacing the first axially movable coupling sleeve will be low. The low axial velocity and the low power needed for displacing the first axially movable coupling sleeve will reduce the force acting on the first axially movable coupling sleeve, the sun wheel, the planet gear carrier, the gearbox housing and on the ring wheel at the moment of engagement. Thus, wear and stress on the axially directed end surfaces of the splines of these components may be reduced.

According to an example, the second axially movable coupling sleeve, on an inner surface, comprises second splines, which are configured to engage with second splines arranged on the ring gear, the planet gear carrier and the output shaft.

A simple and efficient engagement and disengagement of the output shaft and the ring gear, and the output shaft and the planet gear carrier, respectively, are achieved by means of the second splines. However, when engaging two components provided with splines, the axially directed end surfaces of splines may interfere with each other. This depends on how the components are directed in the rotational direction in relation to each other. Since the axial stroke of the second axially movable coupling sleeve is short the velocity and the power needed for axially displacing the second axially movable coupling sleeve will be low. The low axial velocity and the low power needed for displacing the second axially movable coupling sleeve will reduce the force acting on the second axially movable coupling sleeve, the planet gear carrier and the output shaft at the moment of engagement. Thus, wear and stress on the axially directed end surfaces of the splines of these components may be reduced.

According to an example, the sun gear is connected to the input shaft of the gearbox.

Torque from the input shaft is transferred directly to the sun gear. In the first gear position, corresponding to a low range position, the torque is transferred from the input shaft directly to the sun gear and further to the planetary wheels and the planet gear carrier to the output shaft. In the second gear position, corresponding to a high range position, the torque is transferred from the input shaft directly to the sun gear and further to the ring gear and the output shaft.

According to an example, the gearbox is a range gearbox.

A range gearbox aims to double the number of gear opportunities in a powertrain. The range gearbox may be shifted into two different gears. In a low range gear position a downshift takes place through the range gearbox, and in a high range gear position, the gear ratio is 1:1 through the range gearbox.

According to an example, the input shaft is configured to be connected to a main gearbox.

The range gearbox may be connected to a main gearbox in a powertrain. Thus, the number of gears in the main gearbox may be doubled by means of the range gearbox.

According to an example, the first gear position of the first and second axially movable coupling sleeves corresponds to a low range gear in the range gearbox.

The planetary gear in the gearbox has a low and a high gear and shifting capability of the gearbox may therefore be divided into a low range gear and a high range gear. The first gear position corresponds to the low range gear position in the range gearbox. A downshift takes place in the planetary gear when the range gearbox is shifted into the low range gear. As a result, the torque transferred through the range gearbox will increase when the range gearbox is shifted into the low range gear position.

According to an example, the second gear position of the first and second axially movable coupling sleeves corresponds to a high range gear in the range gearbox.

When the range gearbox is shifted into the high range gear, the gear ratio is 1:1 in the planetary gear. Thus, there is no gear ratio difference through the range gearbox when the range gearbox is shifted into the high range gear position.

The present disclosure also relates to a vehicle, wherein the vehicle comprises a gearbox.

Such vehicle may be a heavy vehicle, e.g. a truck or a bus. The vehicle may be manually operated, remotely operated or autonomously operated. The vehicle may be propelled by an electrical engine and/or an internal combustion engine.

The present disclosure will now be further illustrated with reference to the appended figures.

Figure 1:
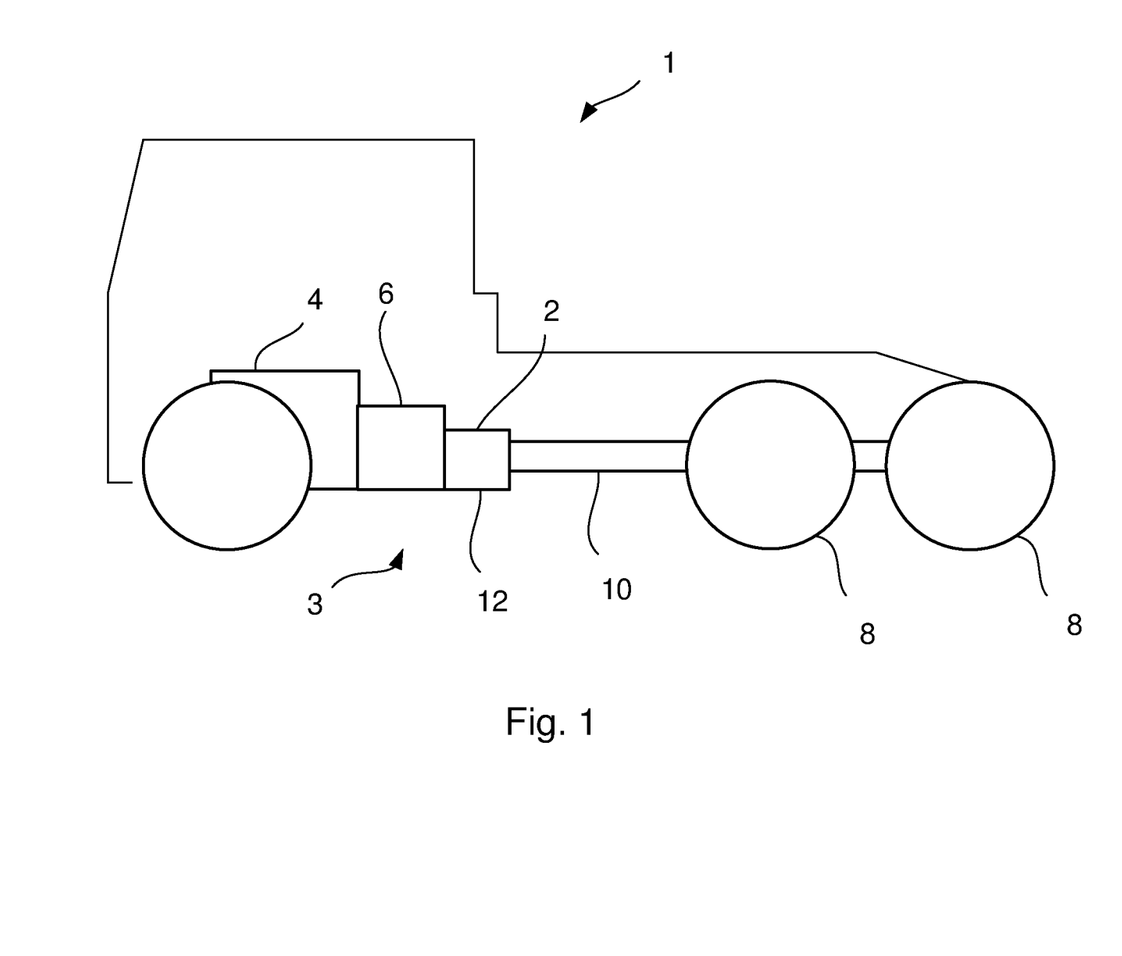
FIG. 1 schematically illustrates a vehicle in a side view with a gearbox according to an embodiment, FIG. 2 schematically illustrates a cross section of the gearbox according to an embodiment in a low range gear position, FIG. 3 schematically illustrates a cross section of the gearbox according to an embodiment in a neutral position, FIG. 4 schematically illustrates a cross section of the gearbox according to an embodiment in a high range gear position, FIG. 5 schematically illustrates a cross section of the gearbox according to an embodiment in a neutral position, FIG. 6 schematically illustrates a cross section of the gearbox according to an embodiment in a reverse position, and FIG. 7 schematically illustrates a cross section of the gearbox according to an embodiment in a neutral position.

FIG. 1 schematically illustrates a vehicle 1 in a side view with a gearbox 2 according to the present disclosure. The gearbox 2 is included in a powertrain 3, which comprises an internal combustion engine 4, a main gearbox 6 and a propeller shaft 10. The combustion engine 4 is coupled to the main gearbox 6, which in turn is connected to the gearbox 2 of the present disclosure. The gearbox 2 is further connected to the drive wheels 8 of the vehicle 1 via the propeller shaft 10. The gearbox 2 of the present disclosure is a range gearbox, and aims to double the number of gear opportunities. The gearbox 2 is surrounded by a gearbox housing 12.

Figure 2:
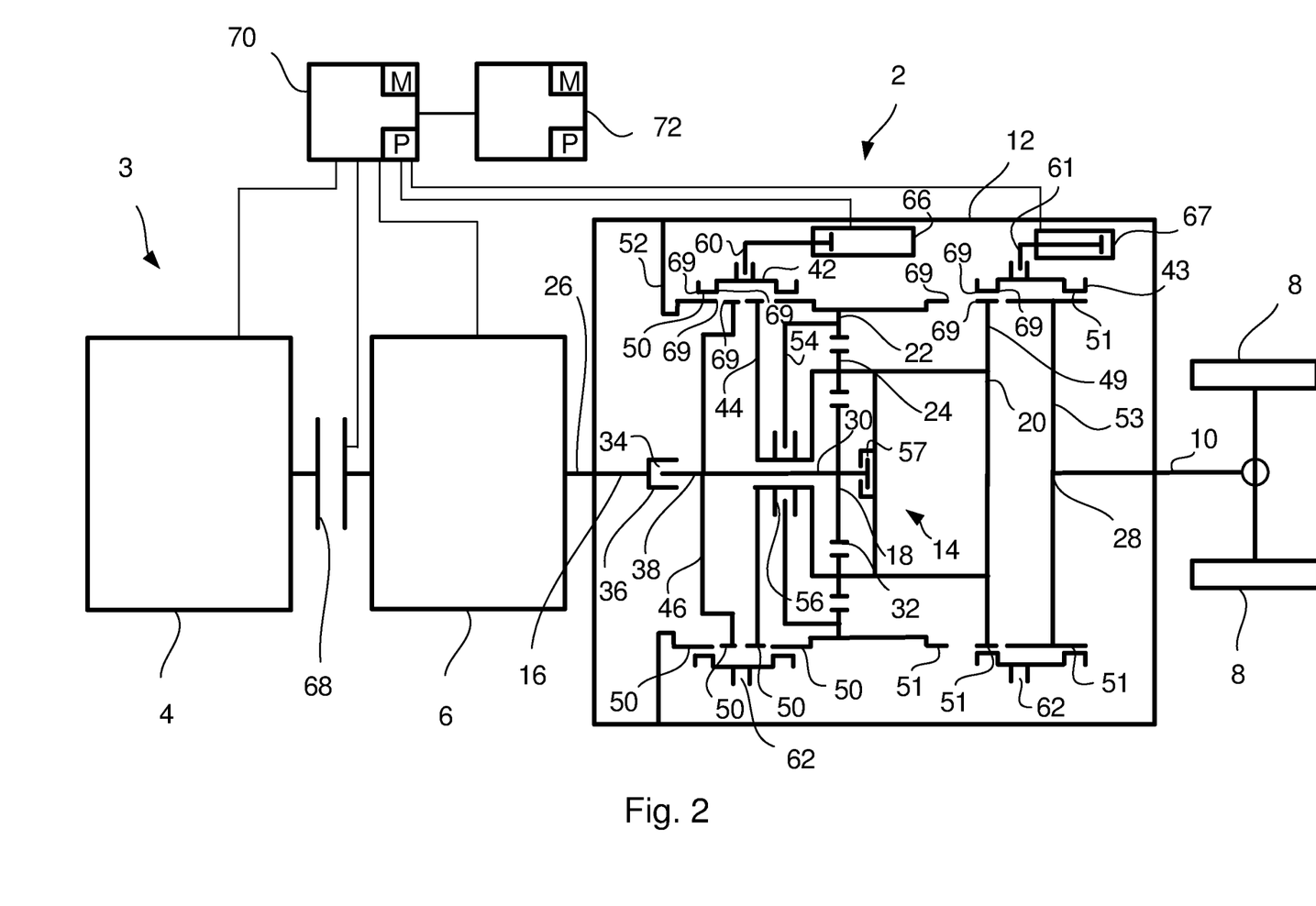

FIG. 2 schematically illustrates a cross section of the gearbox 2 according to an embodiment in a low range gear position. The gearbox 2 comprises a planetary gear 14, which has a low and a high gear, so that the shifting capability of the main gearbox 6 can be divided into a low range gear position and a high range gear position. In a first gear position corresponding to the low range gear position a downshift takes place in the planetary gear 14. In the high range gear position, the gear ratio is 1:1 in the planetary gear 14. FIG. 2 shows the gearbox 2 in the first gear position, corresponding to the low range gear position.

The gearbox 2 is accommodated in the gearbox housing 12 and comprises an input shaft 16 which may be a main shaft 26 of the main gearbox 6. The planetary gear 14 comprises three main components, which are rotatably arranged in relation to each other, namely a sun gear 18, a planet gear carrier 20 and a ring gear 22. A number of planet gears 24 are rotatably arranged with bearings on the planet gear carrier 20. With knowledge of the number of teeth 32 of sun gear 18 and the ring gear 22, the relative gear ratio of the three components can be determined. The sun gear 18 is rotatably connected to the input shaft 16, so that torque and rotational movement may be transferred between the input shaft 16 and the sun gear 18. The planet gears 24 engage the sun gear 18. The ring gear 22 surrounds and engages the planet gears 24. The teeth 32 of the sun gear 18, the planet gears 24 and the ring gear 22 can be helical, so that they have an angle relative to a common axis of rotation 30 of the sun gear 18, the planet gear carrier 20 and the ring gear 22. By cutting the teeth 32 in a sloping angle a reaction force is obtained from the gears 18, 22, 24 in the planetary gear 14 in the direction of axis of rotation 30. The direction of the reaction force depends on the direction in which the teeth 32 of the planetary gear 14 are bevelled. Thus, the reaction force can be directed backward or forward in the axis of rotation 30.

The input shaft 16 may connected to the sun gear 18 by means of a splines connection 34 with an axial extent which allows an angular displacement between the input shaft 16 and the shaft 38 of the sun gear 18. In operation, the main shaft 26 in the main gearbox 6 will, under certain operating condition and great stress, bend or curve due to its elasticity and resilient properties. A permissible angle displacement in the splines connection 34, results in that the sun gear 18 is not affected by bending of the main shaft 26, which reduces stresses on the teeth 32 of the sun gear 18. The splines connection 34 is preferably designed such that the planetary gear 14 can be assembled and disassembled in one piece on the input shaft 16. Thus, the maintenance costs are reduced, since the time required for the repair decreases.

A first axially displaceable coupling sleeve 42 is in a first gear position arranged to engage the gearbox housing 12 with the ring gear 22. The first axially movable coupling sleeve 42 is in the first gear position arranged to disengage the sun gear 18 from the ring wheel 22, and to disengage the planet gear carrier 20 from the gearbox housing 12.

A second axially movable coupling sleeve 43 is configured for selectively engaging and disengaging the ring gear 22, planet gear carrier 20 and an output shaft 28 with/from each other. The second axially movable coupling sleeve 43 is in the first gear position configured to engage the planet gear carrier 20 with the output shaft 28, The first axially displaceable coupling sleeve 42 is on an inner surface provided with first splines 50 arranged to interact with the corresponding first splines 50 arranged on the ring gear 22 and on the periphery of a projection 52, which is fixedly connected to the gearbox housing 12. The first splines 50 on the first axially displaceable coupling sleeve 42 are also arranged to cooperate with corresponding first splines 50 arranged on the input shaft 16. Corresponding first splines 50 disposed on the sun gear 18 are configured on the periphery of a first sprocket 46, which is mounted on the shaft 38 of the sun gear 18. However, it is also possible to arrange the first sprocket 46 on the input shaft 16 instead of on the shaft 38 of the sun gear 18. Thus, the first sprocket 46 may be arranged on either side of the splines connection 34. The first splines 50 on the first axially displaceable coupling sleeve 42 are also arranged to cooperate with corresponding first splines 50 arranged on the planet gear carrier 20. Corresponding first splines 50 disposed on the planet gear carrier 20 are configured on the periphery of a second sprocket 44, which is mounted on the planet gear carrier 20.

The number of first splines 50 of the first axially displaceable coupling sleeve 42 and input shaft 16 preferably may exceed the number of teeth 32 on the ring gear 22. Thus a large number of discrete locked positions between the ring gear 22 and the first coupling sleeve 42 are obtained, which causes a large number of facets formed on the teeth 32 of the gears 18, 22, 24. The facets, however, are close together, so that they together will be experienced as an essentially smooth surface of the teeth 32. The facets therefore do not affect the gearbox 2 function and have no significant effect on the life-span of the gears 18, 22, 24.

The second axially displaceable coupling sleeve 43 is on an inner surface provided with second splines 51, which are arranged to cooperate with corresponding second splines 51 arranged on the ring gear 22, the planet gear carrier 20 and the output shaft 28. The corresponding second splines 51 arranged on the planet gear carrier 20 are configured on the periphery of a third sprocket 49, which is mounted on the planet gear carrier 20. The corresponding second splines 51 provided on the output shaft 28 are formed on the periphery of a fourth sprocket 53 which is mounted on the output shaft 28.

An axial stop 54 arranged on the planet gear carrier 20 is adapted to abut against the ring gear 22. The axial stop 54 prevents the ring gear 22 from moving axially. The axial stop 54 may comprise a disc-shaped plate, which by a first thrust bearing 56, is arranged on the planet gear carrier 20. The axial stop 54 is rotatable relative to the planet gear carrier 20 and the input shaft 16, and follows the rotation of the ring gear 22. The axial stop 54 fixates the ring gear 22 axially. Consequently, the axial bearing of the input shaft 16 in the gearbox 2 is subjected to less stress when the gears 18, 22, 24 are provided with helical teeth.

The low gear in the gearbox 2 is obtained by displacing the second coupling sleeve 42, so that the ring gear 22 is connected to the gearbox housing 12. The axial displacement of the first and second coupling sleeves 42, 43 are provided with a first and second shift fork 60, 61 arranged in an outside circumferential groove 62 in the respective coupling sleeve 42, 43. The first shift fork 60 is influenced by a first power means 66 and the second shift fork 61 is influenced by a second power means 67. The first and second power means 66, 67 may be each a pneumatic or a hydraulic cylinder. The shift forks 60, 61 and power means 66, 67 are schematically illustrated in FIG. 2.

The axial stroke of the coupling sleeves 42, 43 is short and the velocity and the power needed for axially displacing the coupling sleeves 42, 43 will be low. The low axial velocity and the low power needed for displacing the couplings sleeves 42, 43 will reduce the force acting on the coupling sleeves 42, 43, the components 18, 20, 22 of the planetary gear 14, the gearbox housing 12 and on the output shaft 28 at the moment of engagement. Axially directed end surfaces 69 of these components, such as axially directed end surfaces 69 of the splines 50, 51 may resist wear and stress that may occur from these axially directed forces. Further, the first axially movable coupling sleeve 42 may be performed with a limited longitudinal extent, causing the weight of the first axially movable coupling sleeve 42 to be low. The low mass of the first axially movable coupling sleeve 42 means that it is possible to quickly shift between different gear positions. In addition, the low mass of the first axially movable coupling sleeve 42 may reduce the power needed for axially displacing the first axially movable coupling sleeve 42, which results in low wear and stress on the components for engagement.

Figure 3:
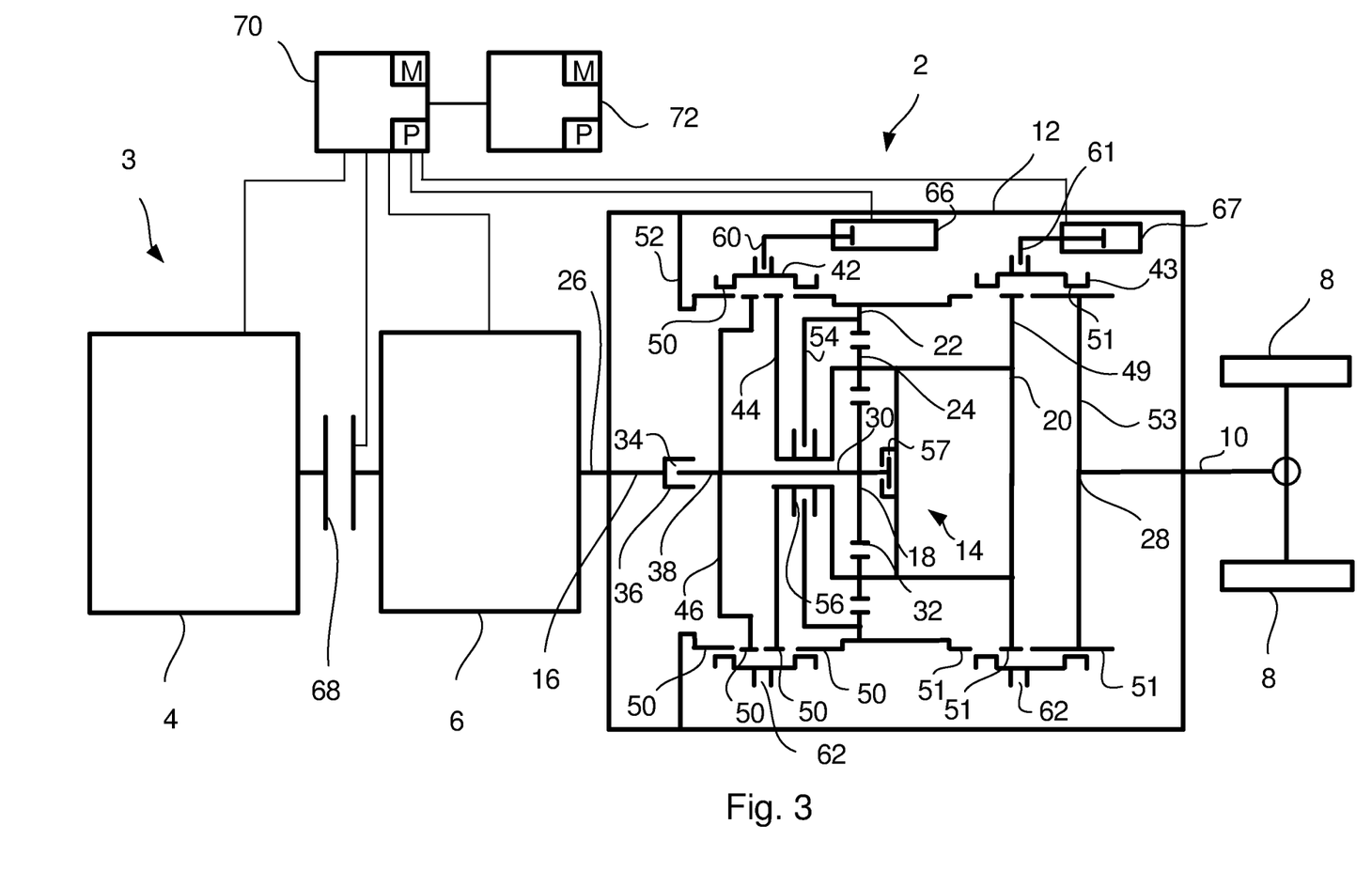

FIG. 3 schematically illustrates a cross section of the gearbox 2 according to an embodiment in a neutral position. In the neutral position, the second axially movable coupling sleeve 43 has been displaced and disengaged from the planetary gear carrier 20 to a position where only the second axially movable coupling sleeve 43 is connected to output shaft 28. Thus, in the neutral position, the ring gear 22 is free to rotate in relation to the output shaft 28. In the neutral position, the gearbox 2 will not transfer any torque from the input shaft 16 to the output shaft 28.

The second axially movable coupling sleeve 43 is, in a neutral position, configured to be positioned in an intermediate axial position between the ring gear 22 and the planet gear carrier 20. The second splines 51 on the second axially movable coupling sleeve 43 still engages the second splines 51 on the output shaft 28, but has disengaged the second splines 51 on the ring gear 22 and on the planet gear carrier 20. The neutral position may be reached by arranging the second splines 51 of the ring gear 22 and the second splines 50 of the planet gear carrier 20 at an axial distance to each other. This distance between the ring gear 22 and the planet gear carrier 20 allows the second splines 51 of the second axially movable coupling sleeve 43 to be disengaged from both the ring gear 22 and the planet gear carrier 20.

When shifting the gearbox 2, and any other gearbox 6 in the same powertrain 3, the second axially movable coupling sleeve 43 will first be moved into the neutral position. After gear shifting is accomplished, the planet gear carrier 20 and the output shaft 28 are engaged, if the gear in question is a low range gear. In FIG. 3, the first axially movable coupling sleeve 42 still is in the first position and thus still engages the ring gear 22 and the gearbox housing 12. This will result in an even wear on the second splines 51 on the ring gear 22 and on the output shaft 28.

Figure 4:
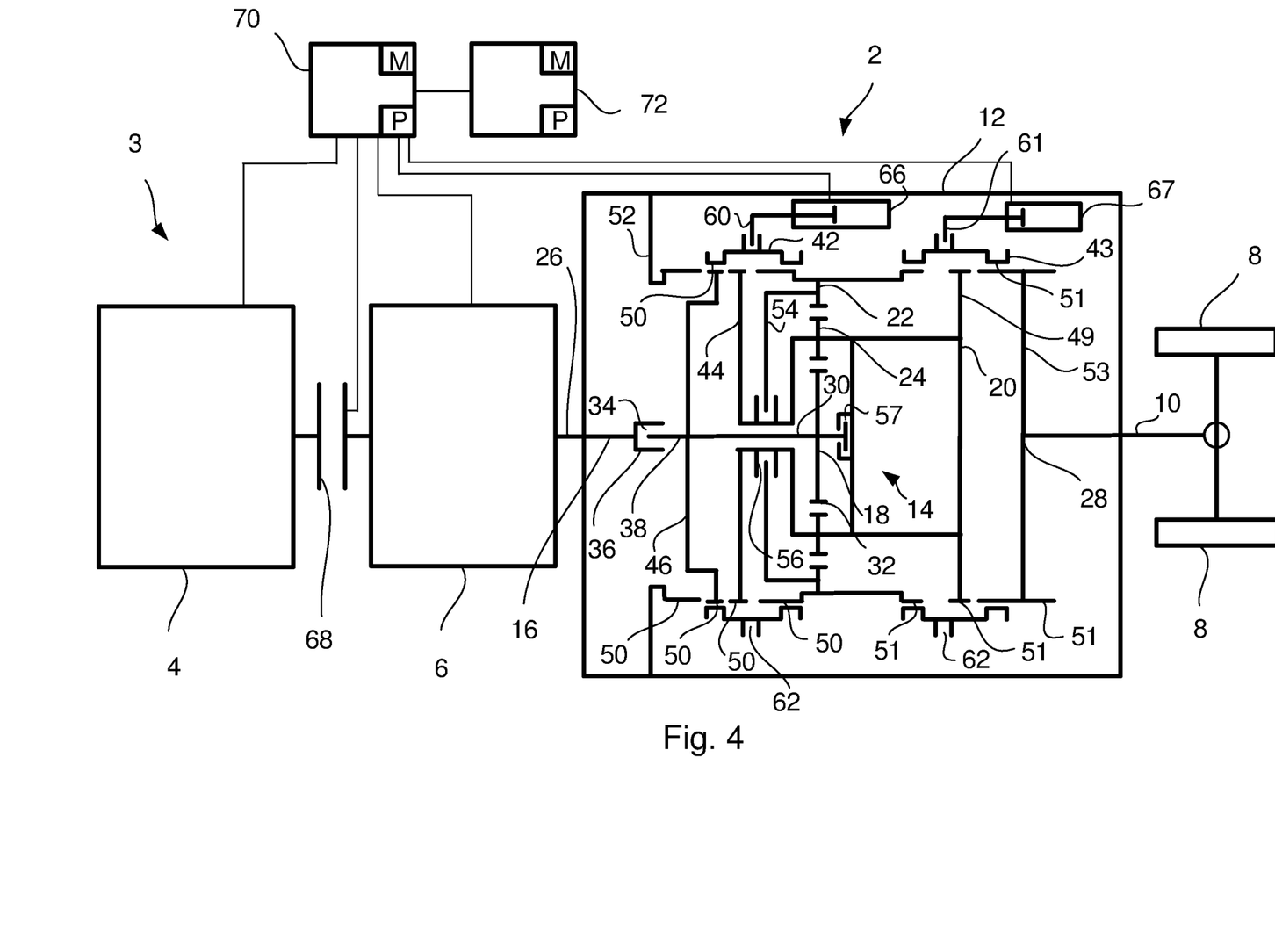

FIG. 4 schematically illustrates a sectional view of the gearbox 2 according to the disclosure in the second gear position or the high range gear position. In the second gear position, the first axially movable coupling sleeve 42 engages the sun gear 18 and the ring gear 22. In the second gear position, the second axially movable coupling sleeve 43 engages the ring gear 22 and the output shaft 28. Torque from the input shaft 16 to the output shaft 28 is in the high range gear position transferred from the input shaft 16 and the sun gear 18 to the ring gear 22 and further to the output shaft 28. This results in that the gear ratio through the planetary gear 14 becomes 1:1.

Figure 5:
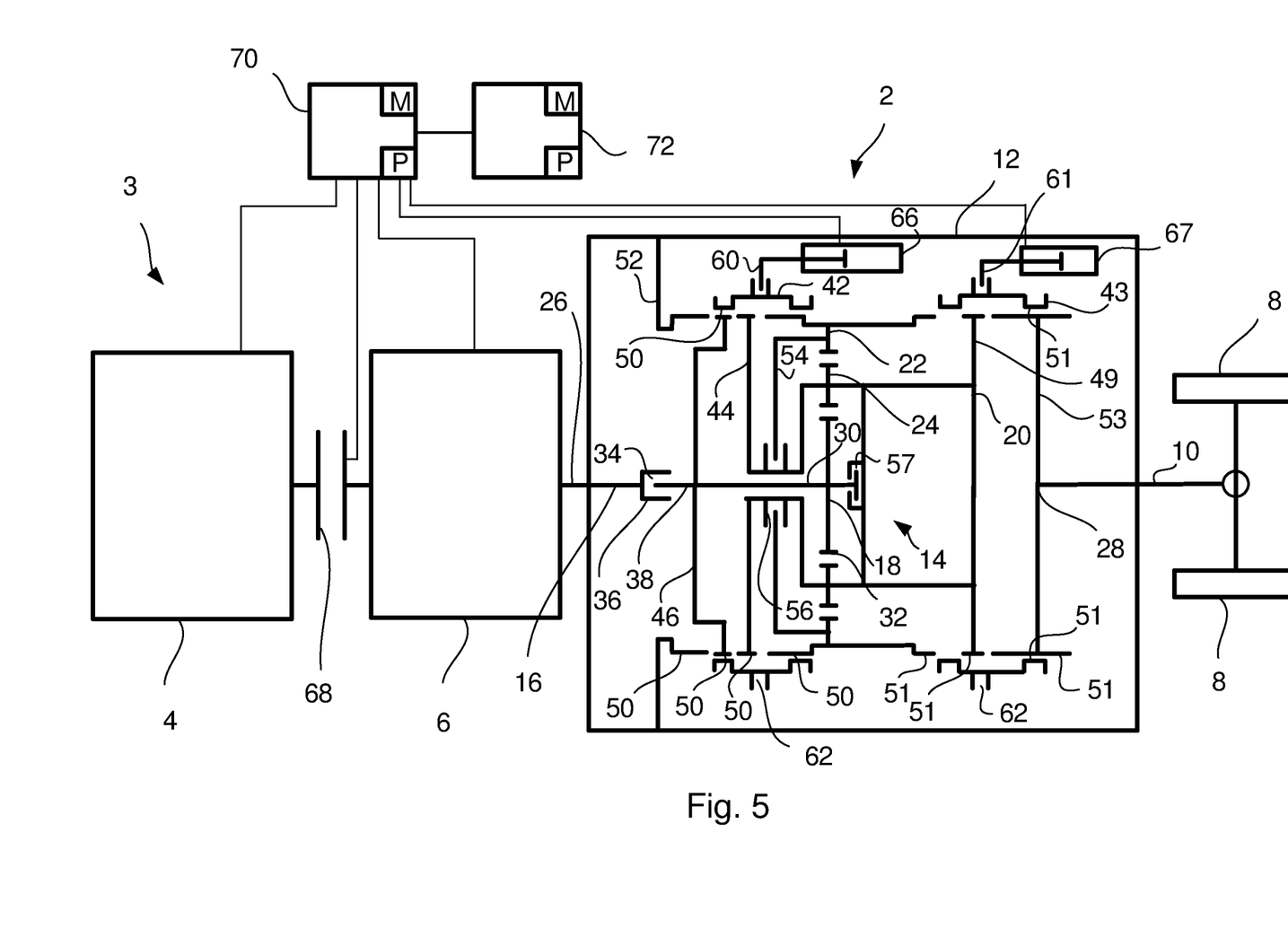

FIG. 5 schematically illustrates a cross section of the gearbox according to an embodiment in a neutral position. When shifting the gearbox 2, and any other gearbox 6 in the powertrain 3, the second axially movable coupling sleeve 43 will first be displaced to the neutral position. After gear shifting is accomplished, the ring gear 22 and the output shaft 28 are engaged, if the gear in question is a high range gear. In FIG. 5 the first axially movable coupling sleeve 42 still is in the second position and thus still engages the ring gear 22 and the sun gear 18.

From above, it is evident that the next coming gear position may be reached from the neutral position in two different ways. If the following gear is a low range gear, the second axially movable coupling sleeve 43 will be shifted from the neutral position to the first gear position in which the second axially movable coupling sleeve 43 engages the planet gear carrier 20 and the output shaft 28. If the following gear is a high range gear, the second axially movable coupling sleeve 43 will be shifted from the neutral position to the second gear position in which the second axially movable coupling sleeve 43 engages the ring gear 22 and the output shaft 28. Thus, the second axially movable coupling sleeve 43 may alternately engage the planet gear carrier 20 and the ring gear 22. This will result in an even wear on the second splines 51 on the ring gear 22 and on the output shaft 28.

Referring to FIGS. 2-5, the gearbox 2 according to the disclosure functions as described below when shifting from the first to the second gear position, that is, from the low range gear position to the high range gear position. In FIG. 2, the gearbox 2 has been shifted into the low range gear position, which means that the first axially movable coupling sleeve 42 has been shifted to a position to connect the ring gear 22 with the gearbox housing 12. Thus, when the gearbox 2 is in the low range gear position, a downshift takes place through the planetary gear 14. The shifting operation from the low range gear position to the high range gear position is made by disengaging the planet gear carrier 20 from the output shaft 28 by means of the second axially movable coupling sleeve 43. This disengagement may be possible when no torque is transferred between the planet gear carrier 20 from the output shaft 28, which may be accomplished by disconnecting the internal combustion engine 4 from the main gear box 6 through disconnection of a clutch 68. Alternatively, the internal combustion engine 4 is controlled to generate a torque balance between the planet gear carrier 20 from the output shaft 28. When the second axially movable coupling sleeve 43 no longer transfers any torque, the axial displacement of the second axially movable coupling sleeve 43 is possible. When the planet gear carrier 20 has been disengaged from the output shaft 28, the first axially movable coupling sleeve 42 may, after synchronization, be displaced in order to engage the sun gear 18 with the ring gear 22. Finally, the rotational speed of the ring gear 22 is synchronized with the rotational speed of the output shaft 28, so that the second axially movable coupling sleeve 43 may engage the ring gear 22 with the output shaft 28. Thus, the gearbox 2 operates in the high range gear position.

Figure 6:
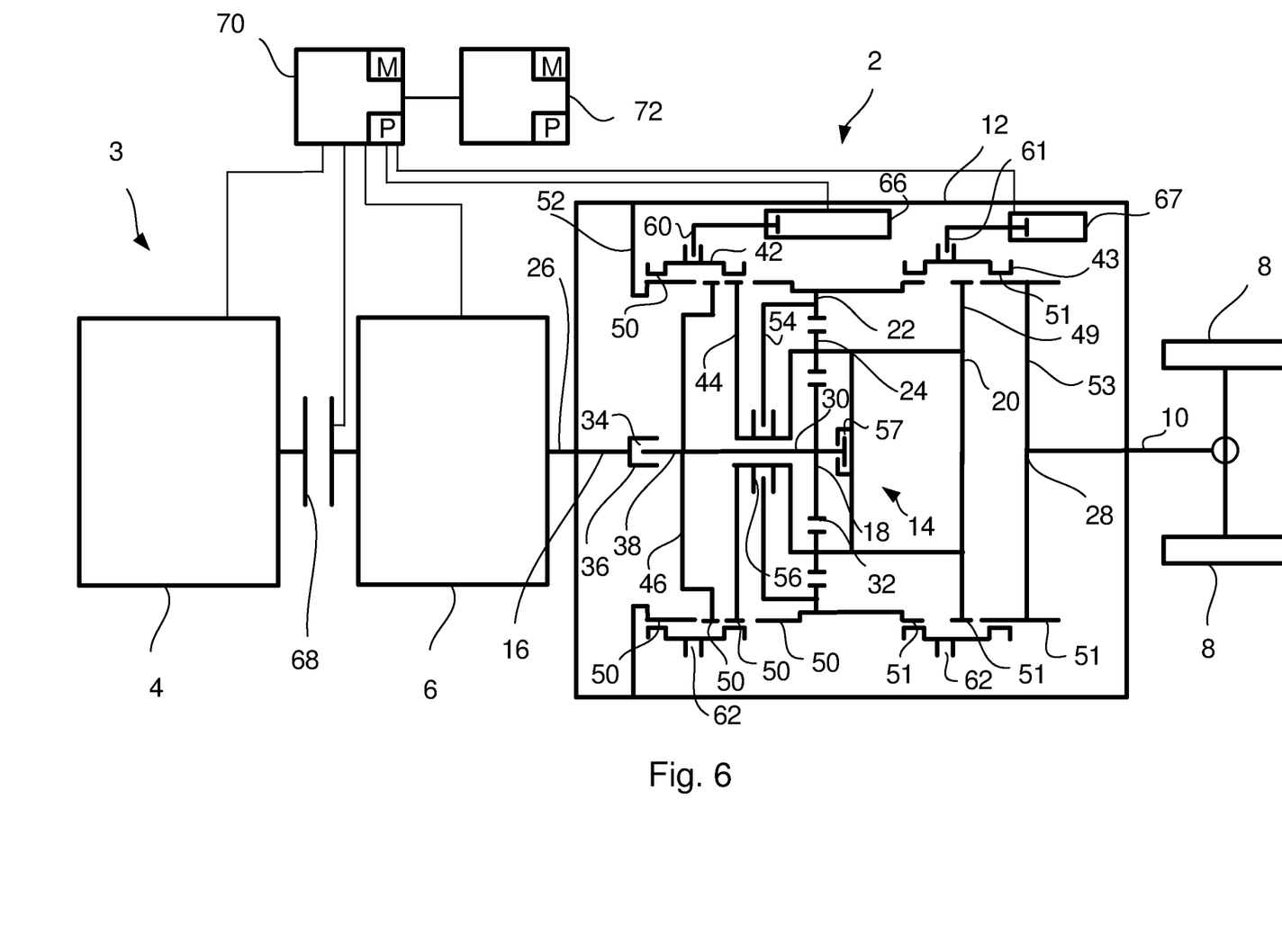

FIG. 6 schematically illustrates a cross section of the gearbox 2 according to an embodiment in a reverse position. In FIG. 6, the gearbox 2 has been shifted into the third gear position, which is the reverse gear. The second axially displaceable sleeve 43 is in the third gear position arranged to connect the ring gear 22 with the output shaft 28. Thus, the second coupling sleeve 43 is shifted by the second shift fork 61, so that the ring gear 22 is connected to the output shaft 28 and the ring gear 22. The first coupling sleeve 42 is shifted by the first shift fork 60 to couple the planet gear carrier 20 with the gearbox housing 12. The displacement of the respective clutch sleeve 42, 43 is performed when the input and the output shaft 16, 28 are stationary, which corresponds to a stationary operating state of the vehicle 1, when the gearbox 2 is included in the powertrain 3 of the vehicle 1. In order to provide a stationary position of the input shaft 16, the clutch 68 of the vehicle 1 is transferred to a disconnected mode. When the gearbox 2 is operated in the third gear position, torque is transmitted from the input shaft 16 to the sun gear 18 and further to the planet gears 24 which transmits the torque to the ring gear 22 and further to the output shaft 28 via the second coupling sleeve 43. The planet gear carrier 20 is stationary as the first coupling sleeve 42 connects the planet gear carrier 20 with the gearbox housing 12.

Figure 7:
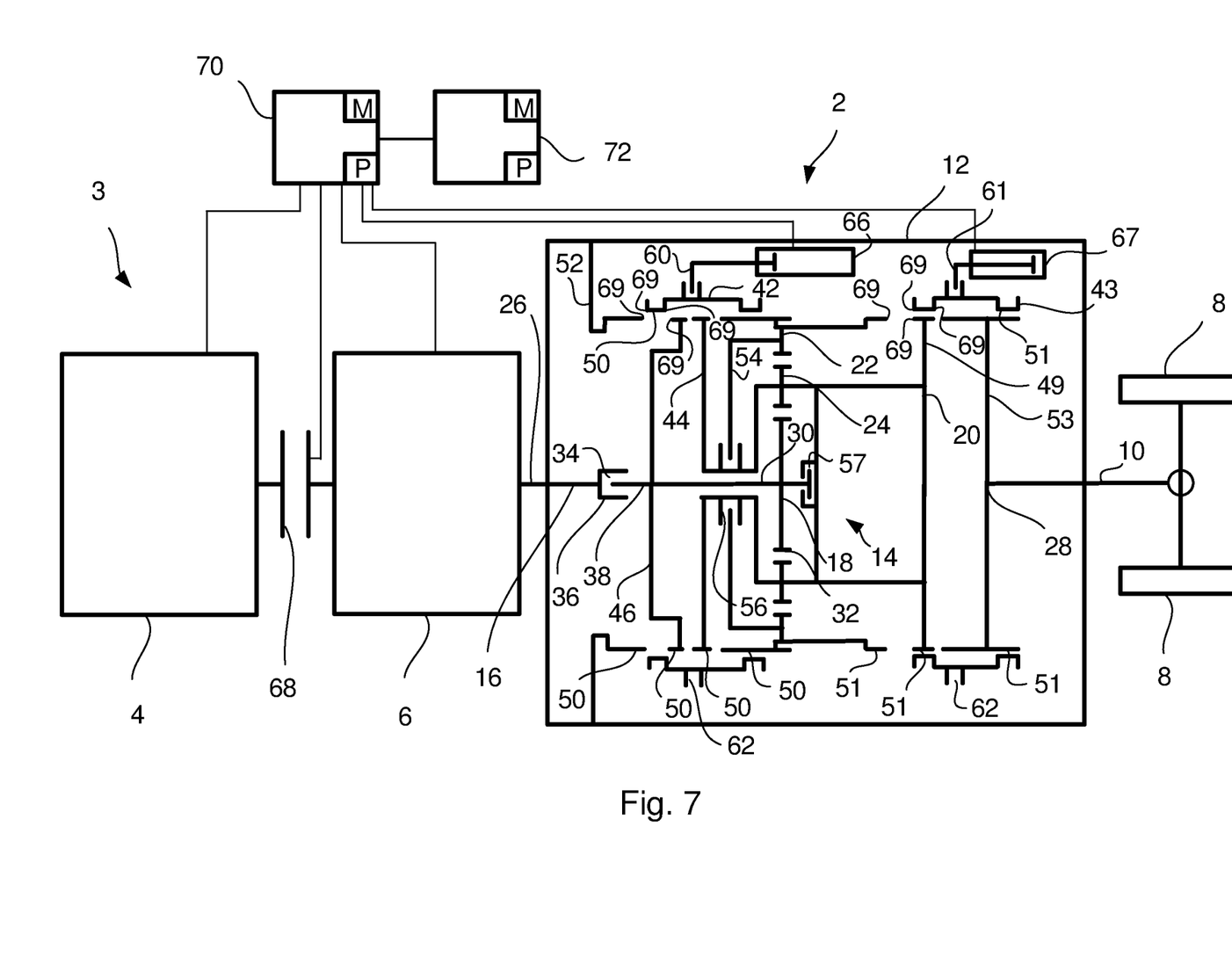

FIG. 7 schematically illustrates a cross section of the gearbox 2 according to an embodiment in a neutral position. The first axially movable coupling sleeve 42 may, in a fourth gear position, be configured to disengage the planetary gear 14 from the gearbox housing 12 and to disengage the ring gear 22, the sun gear 18 and the planet gear carrier 28 from each other. A neutral position may thus be achieved in the gearbox 2. In the neutral position, the gearbox may transfer no torque. Thus, the input shaft of the gearbox may rotate without transferring torque and rotational speed to the output shaft 28 of the gearbox 2. The neutral may be reached by arranging the first splines 50 of the gearbox housing 12 and the first splines 50 of the sun gear 18 at an axial distance to each other. This distance between the gearbox housing 12 and the sun gear 18 allows first splines of the first axially movable coupling sleeve 42 to be disengaged from both the gearbox housing 12 and the sun gear 18. The neutral position according to the fourth gear position, controlled by the displacement of the first axially movable coupling sleeve 42, may be set in combination with a displacement of the second axially movable coupling sleeve 43 to the neutral position. Such combination of neutral positions generated by both coupling sleeves 42, 43 may be used during service and repair of the gearbox 2. However, the synchronization when shifting gears in the gearbox 2 may be more efficient if the second axially movable coupling sleeve 43 engages the output shaft 28 and the planet gear carrier 28 in the fourth gear position.

The first coupling sleeve 42 may be provided with three circular areas. Two areas are contact areas and are provided with the first splines 50. Between the two contact areas a central area is provided which separates the two contact areas from each other. The second coupling sleeve 43 may also be provided with three circular areas. Two areas are contact areas and are provided with the second splines 51. Between the two contact areas a central area is provided which separates the two contact areas from each other.

An electronic control device 70 is coupled to the gearbox 2, the main gearbox 6, the combustion engine 4 and the clutch 68 to achieve the gear shifting above. Preferably, a number of (not shown) speed sensors in the gearbox 2, in the main gear box 6 and in the internal combustion engine 4 may be connected to the control device 70. Another computer 72 may also be connected to the control device 70. The control device 70 may be a computer with appropriate software for this purpose. The control device 70 and/or the computer 72 comprise a computer program P, which can include routines to control the gearbox 2 of the present disclosure. The program P may be stored in an executable form or compressed form in a memory M and/or in a read/write memory. Preferably there is provided a computer program product comprising a program code stored on a, by a computer readable medium for performing the gear shiftings above, when said program is run on the control device 70 or another computer 72 connected to the control device 70. Said code may be non-volatile, stored in said computer readable medium.

The foregoing description of the embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the embodiments in terms of its various embodiments and with the various modifications that are applicable to its intended use. The components and features specified above may, within the framework of the embodiments, be combined between different embodiments specified.

The invention claimed is:

1. A gearbox for a vehicle, the gearbox comprising:
   a planetary gear with a ring gear, a sun gear and a planet gear carrier, on which at least one planet gear is rotatably mounted, which ring gear and sun gear are configured to engage with the at least one planet gear;
   a gearbox housing surrounding the planetary gear;
   an input shaft and an output shaft for transfer of torque to and from the gearbox;
   a first axially movable coupling sleeve for selectively engaging and disengaging the planetary gear with/from the gearbox housing and for selectively engaging and disengaging the ring gear, the sun gear and the planet gear carrier with/from each other; and
   a second axially movable coupling sleeve for selectively engaging and disengaging the output shaft with/from the ring gear and with/from the planet gear carrier;
   wherein
   the first axially movable coupling sleeve, in a first gear position, is configured to engage the ring gear with the gearbox housing, and in a second gear position is configured to engage the sun gear with the ring gear;
   the second axially movable coupling sleeve, in the first gear position, is configured to engage the planet gear carrier with the output shaft, and in the second gear position is configured to engage the ring gear with the output shaft; and wherein
   the second axially movable coupling sleeve, in a neutral position, is configured to be positioned in an intermediate axial position between the first and second gear positions.

2. The gearbox according to claim 1, wherein the first axially movable coupling sleeve is, in a third gear position, configured to connect the planet gear carrier with the gearbox housing, and the second axially movable coupling sleeve is, in the third gear position, configured to connect the ring gear with the output shaft.

3. The gearbox according claim 1, wherein the first axially movable coupling sleeve is, in the first gear position, configured to be disconnected from the sun gear and the planet gear carrier.

4. The gearbox according to claim 1, wherein the first axially movable coupling sleeve is, in a fourth gear position, configured to disconnect the planetary gear from the gearbox housing and to disconnect the ring gear, the sun gear and the planet gear carrier from each other.

5. The gearbox according to claim 1, wherein the first axially movable coupling sleeve, on an inner surface, comprises first splines, which are configured to engage with first splines arranged on the gearbox housing, the sun gear, the planet gear carrier and the ring gear.

6. The gearbox according to claim 1, wherein the second axially movable coupling sleeve, on an inner surface, comprises second splines, which are configured to engage with second splines arranged on the ring gear, the planet gear carrier and the output shaft.

7. The gearbox according to claim 1, wherein the sun gear is connected to the input shaft of the gearbox.

8. The gearbox according to claim 7, wherein the input shaft is configured to be connected to a main gearbox.

9. The gearbox according to claim 8, wherein the first gear position of the first and second axially movable coupling sleeves corresponds to a low range gear in the range gearbox.

10. The gearbox according to claim 8, wherein the second gear position of the first and second axially movable coupling sleeves corresponds to a high range gear in the range gearbox.

11. The gearbox according to claim 1, wherein the gearbox is a range gearbox.

12. The gearbox according to claim 11, wherein the first gear position of the first and second axially movable coupling sleeves corresponds to a low range gear in the range gearbox.

13. The gearbox according to claim 12, wherein the second gear position of the first and second axially movable coupling sleeves corresponds to a high range gear in the range gearbox.

14. The gearbox according to claim 11, wherein the second gear position of the first and second axially movable coupling sleeves corresponds to a high range gear in the range gearbox.

15. The gearbox according to claim 11, wherein the input shaft is configured to be connected to a main gearbox.

16. A vehicle, comprising a gearbox according to claim 1 and an engine.

* * * * *